United States Patent

Skyba

[11] Patent Number: 5,722,640
[45] Date of Patent: Mar. 3, 1998

[54] WINCH AND IMPROVED SHEAVE

[76] Inventor: Helmut K. Skyba, Rte. 2, Box 330, Wild Rose, Wis. 54984

[21] Appl. No.: 719,636

[22] Filed: Sep. 25, 1996

[51] Int. Cl.$^6$ .................................................. B66D 1/00
[52] U.S. Cl. ...................................... 254/333; 254/371
[58] Field of Search .............................. 254/371, 372, 254/374, 333; 226/182, 193

[56] References Cited

U.S. PATENT DOCUMENTS

| | | |
|---|---|---|
| 361,573 | 4/1887 | Baville . |
| 449,676 | 4/1891 | Hall . |
| 574,580 | 1/1897 | Serve . |
| 587,806 | 8/1897 | Fox . |
| 2,337,308 | 12/1943 | Buote . |
| 2,802,366 | 8/1957 | Borner . |
| 2,895,714 | 7/1959 | Clark ................... 254/371 |
| 3,302,932 | 2/1967 | Wallin . |
| 4,151,980 | 5/1979 | Burton et al. . |
| 4,413,981 | 11/1983 | White et al. . |
| 4,603,839 | 8/1986 | Ekman et al. . |
| 5,205,793 | 4/1993 | Jones ..................... 474/175 |
| 5,238,227 | 8/1993 | White ..................... 254/371 |
| 5,368,281 | 11/1994 | Skyba . |
| 5,402,985 | 4/1995 | Owens et al. .............. 254/372 |

FOREIGN PATENT DOCUMENTS

| 901545 | 7/1962 | United Kingdom . |
|---|---|---|
| 1233174 | 5/1971 | United Kingdom . |

*Primary Examiner*—Katherine Matecki
*Attorney, Agent, or Firm*—Ryan, Maki, Mann & Hohenfeldt

[57] ABSTRACT

A sheave for advancing a rope by application to said sheave of rotational forces includes a central hub with opposed sheave surfaces each of the opposed surfaces being provided with alternating projections and valleys. The projections of the first one of the surfaces being aligned with a valley of the opposed second surface, each of the projections having a generally flat outer surface which is provided with rounded edges, the valleys being tapered in width toward the hub of the sheave and having a generally flat floor surface, the center of each the valley having a ridge projecting from the floor surface, the ridges each being of a height extending above its associated valley floor surface that is substantially less than the height of the projections.

19 Claims, 6 Drawing Sheets

WINCH AND IMPROVED SHEAVE

FIELD OF THE INVENTION

The present invention relates to an improved sheave for use in applications, such as in a winch, wherein a rope is pulled under tension by either manual or power-driven rotational forces applied to the sheave. The invention also relates to a winch incorporating a power-driven sheave.

BACKGROUND OF THE INVENTION

Manually-operated winches traditionally have a drum around which a rope or cable is wound by rotation of the winch handle. Such a device has a mechanical advantage dependent on the ratio between the length of the handle and the radius of the drum around which the cable is wrapped. This mechanical advantage decreases, however, as the cable is wound on the drum due to the increase in the effective diameter of the drum caused by wrapping of successive layers of rope or coil thereon. Great stresses are, moreover, applied to the rope or cable as it is wound which substantially shorten its service life.

Efforts have heretofore been made to develop sheaves which enable applications of tensile forces to single loops of ropes, cords or cables. In order to ensure adequate gripping of the rope, it has been felt necessary to utilize pointed teeth for this purpose. See for example, British Patent No. 1 233 174 or U.S. Pat. No. 4,151,980, issued May 1, 1979 to Burton et al. The sharp teeth utilized, however, tend to rapidly fray a rope or cord, greatly reducing the service life of the rope or cord due to the rapid destruction thereof. A need has thus existed for improved sheaves which would have improved effectiveness in pulling a rope while avoiding shortening the service life thereof.

SUMMARY OF THE INVENTION

The present invention provides a shears which avoids the problems of the prior art. The invention also provides a winch wherein the pulling force remains constant by virtue of the fact that a sheave is utilized around which the rope or cable travels but that is never wound in more than a single loop around the sheave. The pulling direction, moreover, remains constant, as the rope is not caused to travel from side to side along a drum surface, as in the case of a conventional winch.

In accordance with one aspect of the invention, a sheave is provided having opposed surfaces which form a serpentine channel for grasping a rope. In accordance with a related aspect, the components forming the facing surfaces of the sheave utilize unsharpened or slightly rounded surfaces which effectively can grip a rope but do not damage the rope as it travels around the pulley.

In accordance with the further related aspect of the invention, the working surfaces of the shears have alternating, interfitting projections and channels or valleys, which channels progressively narrow in dimension from the outer perimeter of the sheave to its inner hub.

In accordance with a further aspect of the invention, each valley, formed between primary projections on the face of the sheave, is provided with a small, rounded, generally radially extending secondary projection or ridge on the floor surface of each valley. In accordance with this aspect of the invention, the presence of such small, preferably rounded ridges enables application of substantial pulling forces to a rope which would otherwise slip along the surface of the sheave. It is believed that the opposing primary ridge forces a cord or rope into its opposing valley and tightly against the secondary ridge, which thus substantially increases the ability of the sheave to retain and apply tensile forces to a rope without slippage thereof in an axial direction.

In accordance with yet still a further aspect of the invention, a winch is provided in which a mechanical advantage is based on the length of the winch handle relative to the diameter of the hub of the sheave. In accordance with a preferred embodiment, a stripper bar is also located adjacent to the hub of the sheave to ensure clean removal of the rope from the sheave as it travels there around.

In accordance with yet another related aspect, a cam surface such as a follower wheel or and movable arcuate cam surface, is provided which is biased against the rope near the point at which it exists the sheave. The cam surface is important in maintaining firm contact between the rope and the sheave without slippage, thus enabling the rope to be pulled under tension by the sheave. The rope, moreover, is maintained in firm contact with the sheave when there is no load on the rope, thus enabling instant initiation of a pulling load without slippage. In accordance with a further related aspect, the cam surface is movable to a location, separated from the sheave, leaving one side of the winch open so that any part of the rope can be looped over the winch. Thus, needless turning of the winch to take up slack rope is avoided.

In accordance with yet further aspects of the invention, a winch can be provided utilizing the sheave either with a single, manually-operated handle or with mechanical advantage increased by the use of appropriate gears.

Still further objects and advantages of the invention will be apparent from the following detailed description, the claims and the accompanying drawings.

BRIEF DESCRIPTION OF THE DRAWINGS

FIG. 7 illustrates the use of a winch device of the invention in a rescue operation;

DETAILED DESCRIPTION

Referring more specifically to the drawings, a winch device of the present invention is generally indicated by numeral 10. Winch device 10 includes a body portion 12 which rotatably holds a sheave 14 onto which a rope 16 may be reeved and, in use, pulled under tensile forces by rotation of the sheave under power. In the illustrated embodiment, a boat 20 is pulled onto the bed 22 of a trailer which is attached by means of hitch 24 to a towing motor vehicle. A suitable mounting post 26 is integral with the trailer frame 22 for attachment of sheave 10 by means of a supporting bracket 28.

Figure 1:
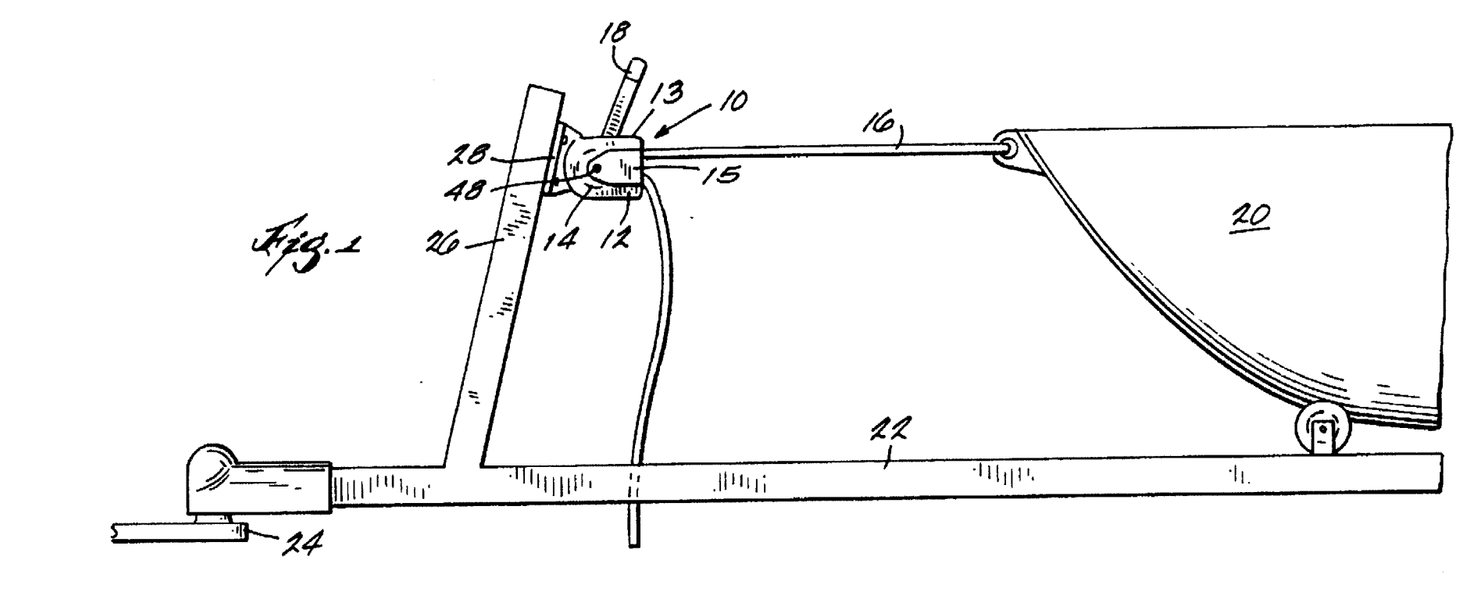
FIG. 1 is a fragmentary side view showing the use of a sheave of the present invention in a winch mounted on a boat trailer.

It will be noted from FIG. 1 that as sheave 14 is rotated by means of a crank handle 18, only a single strand of rope 16 extends over the sheave 14. Thus, unlike conventional winches, which in use, gradually lose their mechanical advantage, as the rope or cable is wound around a drum, the winch of the present invention maintains the same mechanical advantage due to the fact that the ratio between handle 18 and sheave 14 always remains constant. A second handle 19, on the side of the sheave 14 opposite handle 18, shown by phantom lines in FIG. 2, may be used in situations wherein the addition thereof promotes convenient or effective use of the winch.

Figure 3:
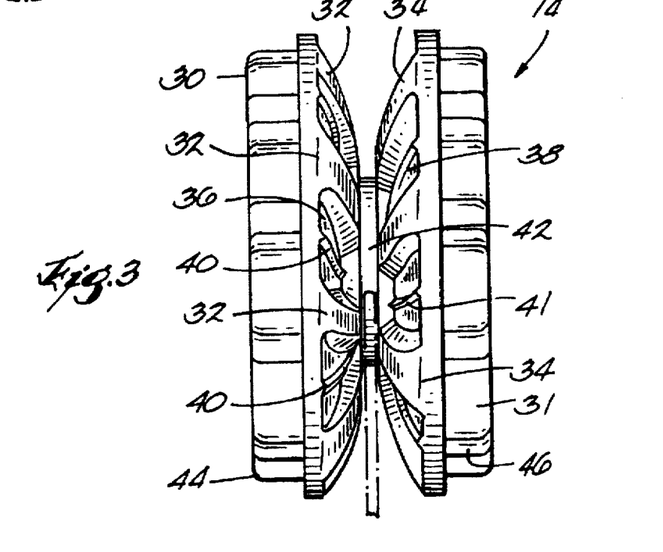
FIG. 3 is a front elevational view of a shears of this invention.
Figure 4:
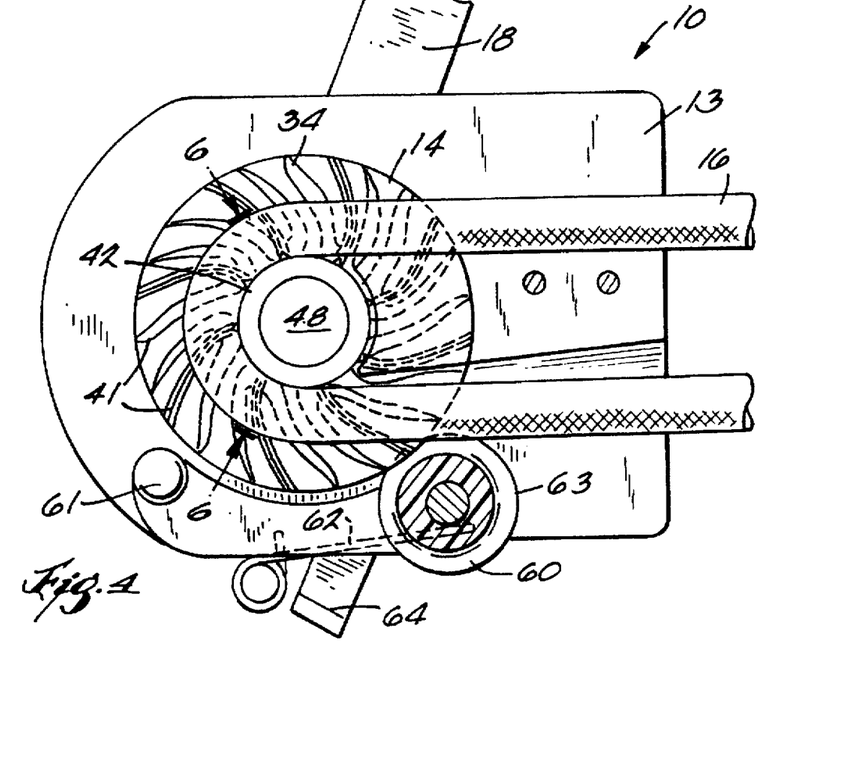
FIG. 4 is a central sectional view of the winch of FIG. 2 showing a rope in place thereon.

Referring to FIG. 3, it is seen that sheave 14 is formed of two interfitting halves 30 and 31. The faces of the halves 30 and 31 are oriented so that a series of primary projections 32 and secondary projections 40 are provided around the circumferential face of half 30. Similarly, primary projections 34 and secondary projections 41 are provided around the circumference of the interior face of sheave half 31. Primary projections 32 alternate with valleys 36 along the center of which the secondary projections 40 are located. Similarly, primary projections 34 alternate with valleys 38 along the center of which are provided secondary projections 41. The two surfaces are placed in an alignment where each primary projection 32 or 34 is in alignment with the secondary projection 41 or 40 of the opposite sheave surface. A central hub surface 42 is located at the central part of the sheave. A series of ratchet teeth 44 and 46 may be provided on one or both of the sheave halves 30 or 31 in order to provide a capability of one way ratchet advancement of the winch 10. Note, also in FIG. 3 that the inner sheave surfaces converge arcuately toward the center of the sheave. The primary ridges 32, 34 and the secondary ridges 40, 41 as well as the valleys 36, 38 within which the secondary ridges 40, 41 are located, all also converge toward the center. Thus, a highly effective but non-destructive wedging action on the rope is provided.

Figure 2:
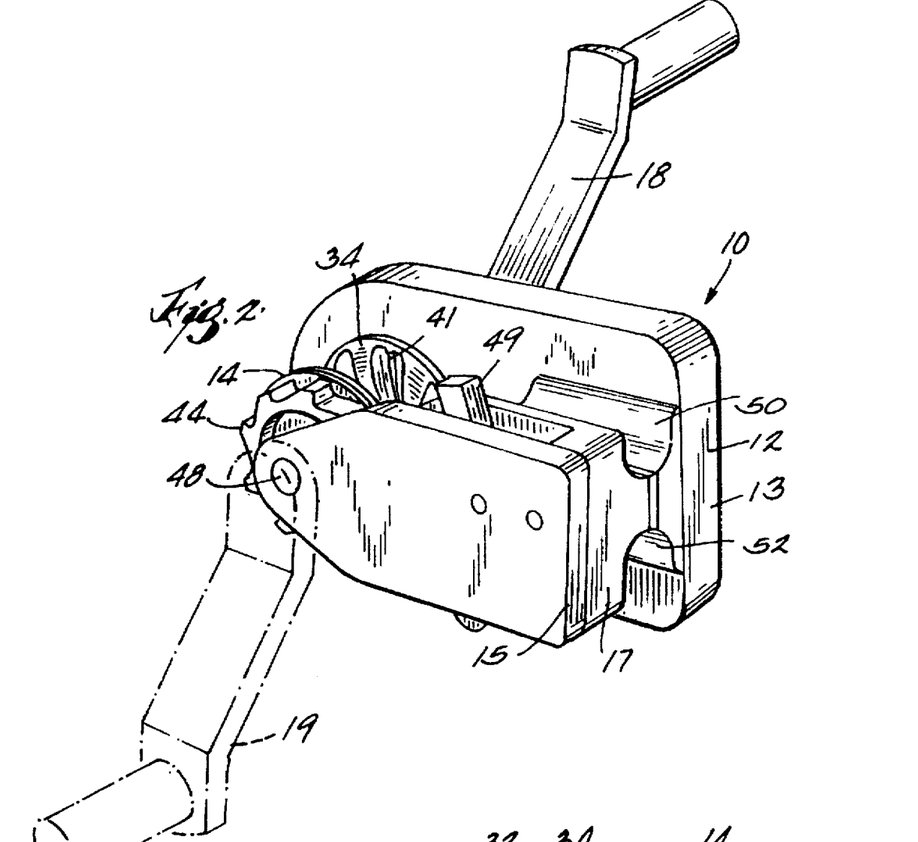
FIG. 2 is a perspective view of a winch device employing a sheave of this invention.

Referring to FIG. 2, it will be noted that the winch housing 12 is formed by plates 13 and 15 on opposite sides of wheel sheave 14 and a central member 17. Member 17 is preferably provided with rope-guiding grooves 50 and 52 which are aligned and in coplanar relationship with the center of sheave 14. Sheave 14 is rotatably secured to a shaft 48 which may also be utilized for attachment thereto of handles 18 and 19.

Figure 6:
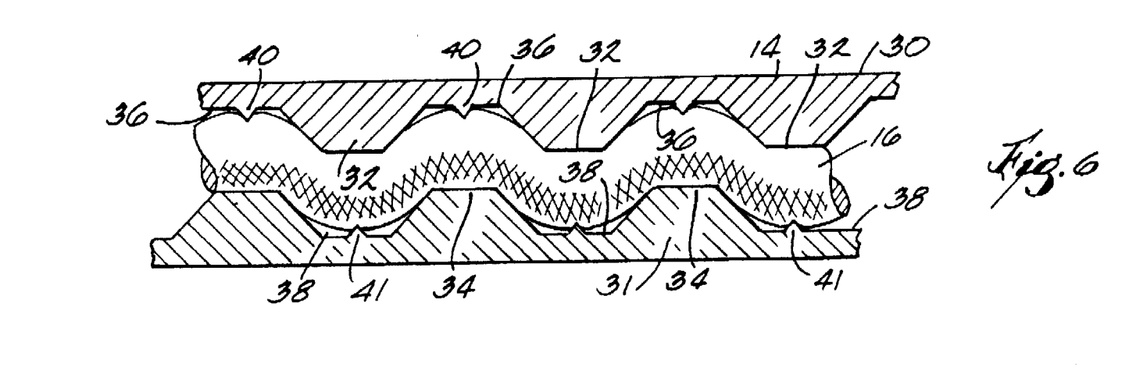
FIG. 6 is a fragmentary top view showing a rope in the sheave of FIG. 3.

Referring to FIG. 6, it will be noted that each of the primary projections 32 and 34 will force a rope 16 into a serpentine path. This serpentine path causes the rope to be alternately pushed into valleys 36 and 38. Stretching of rope 16 into such a serpentine orientation imposes tensile forces on and hardens the surface of rope 16. The presence of secondary ridges 40 and 41 are found, due to their firm engagement with the hardened surfaces of the rope, to provide an extremely effective locking of rope 16 against axial slippage. While such slippage was common with prior art pulleys, the configuration of this invention enables the use of a winch utilizing a single loop over the sheave 14, with the loose end of rope 16 unattached.

Figure 5:
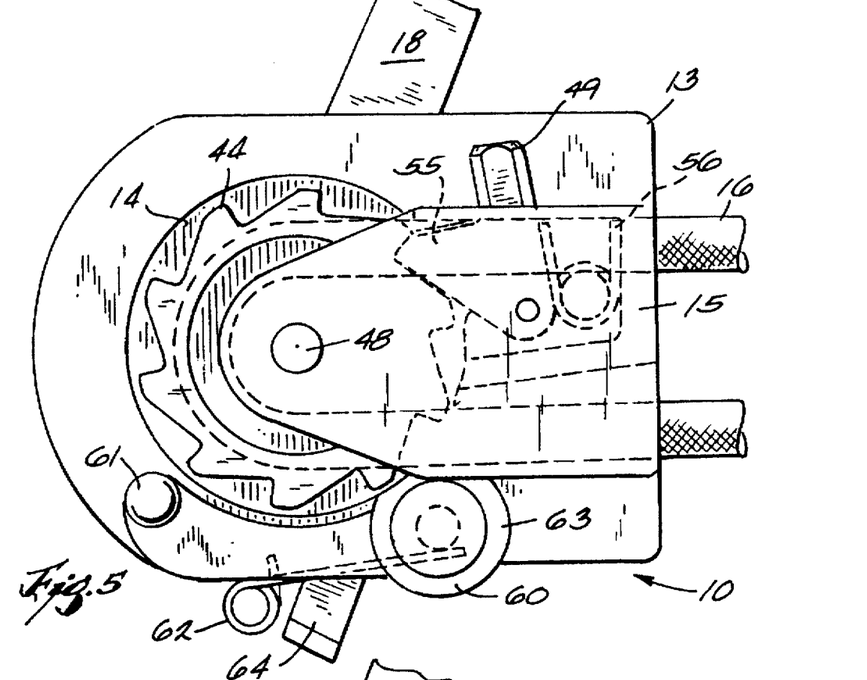
FIG. 5 is a side elevational view of the winch of FIG. 2 with interior parts shown by phantom lines.

A preferred form of ratchet mechanism can be better seen in FIG. 5. As noted, a pawl 55 engages teeth 44. Pawl 55 is biased by spring 56 into contact with teeth 44. A handle 49 is preferably provided in order to enable release of pawl 55 from engagement with ratchet teeth 44. In the view shown in FIG. 5, sheave 14 can be rotated by handle 18 in a counter-clockwise direction but cannot be rotated in a clockwise direction unless handle 49 is pivoted to the right to release pawl 55 from teeth 44.

Also included in winch 10 is a means for biasing rope 16 into contact with sheave 14 at a point at which the rope exists the sheave. The preferred biasing member includes a wheel 60 carried on an arm 59, which is pivotally attached by a pin 61 to housing component 13. A spring 62 biases wheel 60 into contact with rope 16. The surface 63 of the perimeter of wheel 60 is preferably concave, as illustrated. Wheel 60 can be pivoted away from rope 16 to allow easy release thereof from sheave 14. In order to prevent excessive pivoting of wheel 60 away from sheave 14, it is preferred that a stop member 64 be provided. When arm 59 is pivoted away from sheave 14 into contact with stop member 64, it will be noted that one side of sheave 14 is open so that any portion of rope 16 can be looped thereover. Thus it is not necessary to wind up any slack rope, as in the case of conventional winches.

Figure 8:
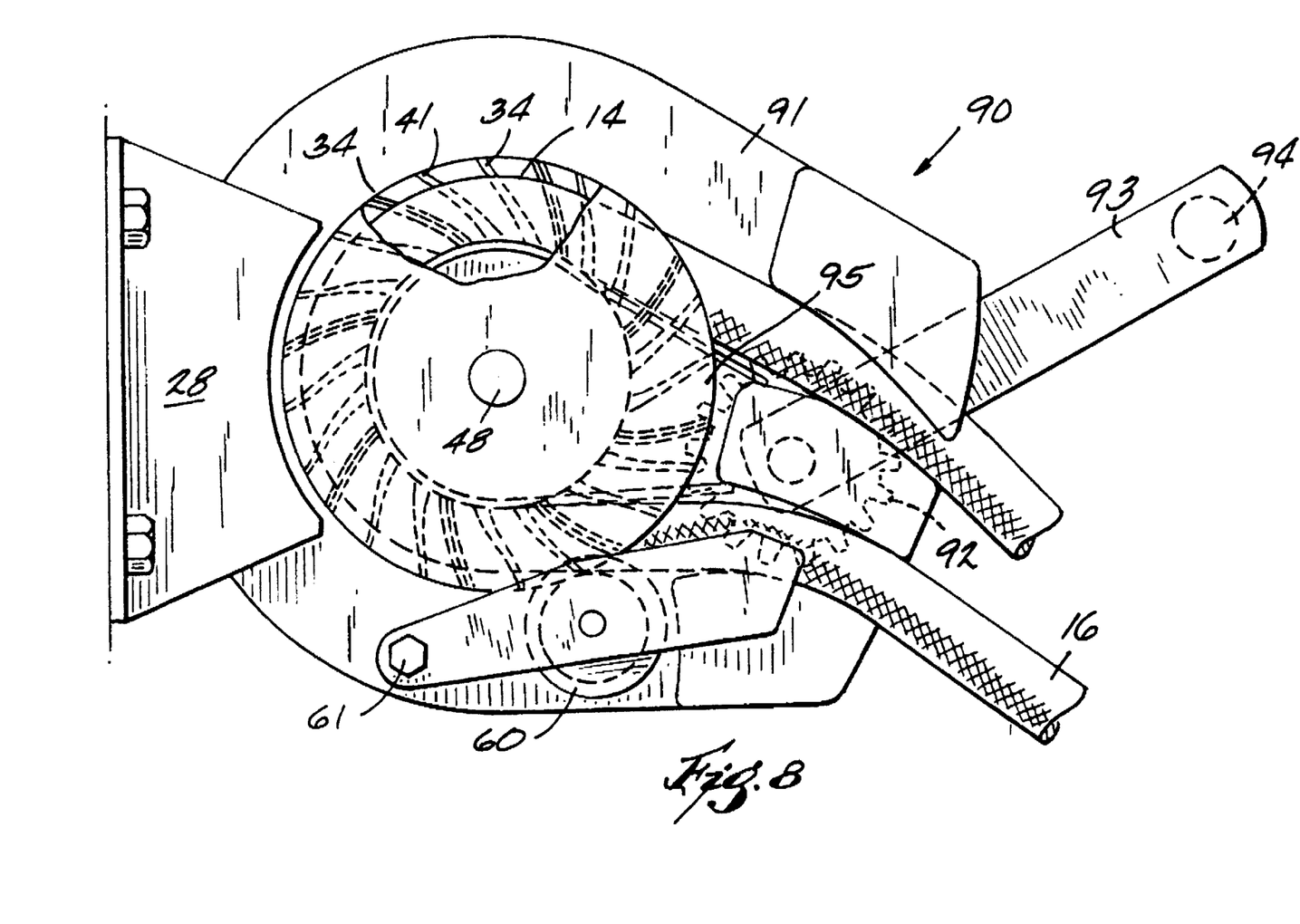
FIG. 8 is a side elevational view with parts broken away illustrating a further embodiment of the invention.

An alternative embodiment of the invention is shown in FIG. 8. In accordance with this embodiment, a winch 90, is provided which also utilizes a sheave 14 of this invention. Commonly numbered parts coincide with those of the earlier embodiment. Sheave 14 is rotatably mounted in a housing 91. A toothed gear 92 is rotatably mounted in housing 91 and secured to a handle 93 for rotation thereof. A conventional gripping handle 94 is provided for that purpose. Gear 92 meshes with the teeth of a second gear 95 which is integrally attached to sheave 14. It will thus be apparent that a mechanical advantage is provided whereby the force applied to handle 93 can be used to rotate sheave 14 with significantly greater force than would otherwise be achievable. As in the case of the earlier described embodiment, a wheel 60 is carried by a pivotable arm 96, which pivots on a bolt 61.

A further application of the invention is illustrated in FIG. 7. In this drawing is illustrated a person 100 who needs to be extricated from a dangerous situation, for example, a crevice among rocks 102. In this case, the end of a rope 16 can be lowered to victim 100. Winch 10 then can be rotated with one handle 18 or two handles 18, 19 by rescue personnel 104. Winch 10 can, for example, be secured by means of a strap 106 which is secured to housing 12 by means of a suitable attachment bracket. Strap 106 can then be secured to a stationary object such as a tree 108. In similar situations, the winch 10 can even be used by the trapped person 100, himself, by appropriately looping, for example, by tossing rope 16 around a stationary object, affixing the winch and one end of the rope to the trapped person 100, who then may rotate handle 18 in order to raise himself out of the trapping location.

Figure 9:
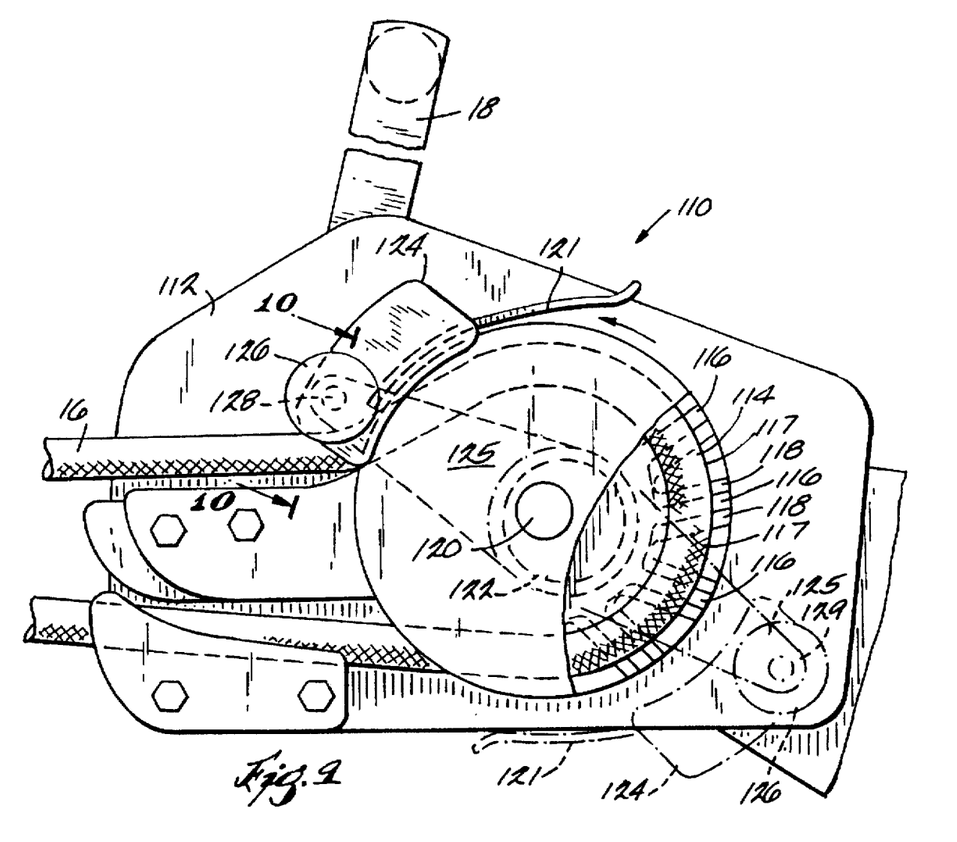
FIG. 9 is a side elevational view with parts broken away illustrating yet another further embodiment of the invention; and, FIG. 10 is a fragmentary cross sectional view taken along Line 10—10 of FIG. 9.
Figure 10:
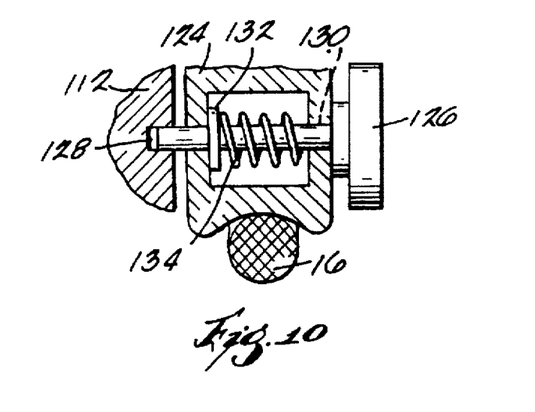

Referring to the further embodiment of FIG. 9, there is seen a winch 110 which incorporates a movable arcuate cam surface 121 in order to retain a rope 16 on a sheave 114 near the point of exit of the rope from the sheave. The winch includes a body 112 which encloses gears (similar to those of winch 90) to drive sheave 114 by means of handle 18. In this case, sheave 114 includes alternating ridges 116 and valleys 117. Ridges 116 are provided with sloping edges 118. Sheave 114 rotates around a shaft 120. Cam follower surface 121 is pivotal about a disk 122 which provides a pivot axis for cam surface 121 that is eccentrically located relative to shaft 120. Cam surface 121 is supported on a block 124 carried by arm 125 which has an opening for pivotally mounting arm 125 on disc 122. In order to temporarily lock the cam surface 121 in a position adjacent to the sheave as seen in FIG. 9 or alternatively in a position spaced from sheave 114, as indicated by phantom lines in FIG. 9, a releasable lock is provide formed by means of a pin 130 which is alternately insertable into indentations 128 and 129 on housing 112. A button 126 is provided to retract pin 130 out of the indentations 128 and 129. A shoulder 132 and coil spring 134 biases the pin 130 into engagement with the indentations 128 and 129. Thus, the cam surface 121 can be alternated between the position shown in FIG. 9 wherein rope 16 is maintained in close contact with sheave 114 and the position shown by phantom lines in FIG. 9. When moved to the alternate position shown by phantom lines, there is enough space between sheave 114 and cam surface 121 to allow insertion of any part of rope 16 around the sheave or, if desired, removal therefrom. The pin mechanism 130 is shown in greater detail in the cross-sectional view of FIG. 10.

While specific preferred embodiments of the invention have been shown for purposes of illustration, it will be apparent to those skilled in the art that various modifications can be made falling within the true scope of the invention.

What is claimed is:

1. A sheave for advancing a rope looped around said sheave by application to said sheave of rotational forces comprising a central hub and opposed, facing first and second surfaces radially outwardly extending from said hub to an outer perimeter, each of said opposed surfaces being provided with alternating primary ridges and valleys extending from said hub to said outer perimeter, the primary ridges of said first one of said surfaces being aligned with a valley of the opposed second surface, said valleys being tapered in width toward said hub of said sheave and having a generally flat floor surface, the center of each said valley having a secondary ridge projecting from said floor surface, said secondary ridges each being of a height extending above its associated valley floor surface that is substantially less than the height of said primary ridges, each of said secondary ridges being in at least approximate alignment with a primary ridge of said facing sheave surface.

2. A winch comprising:

a sheave for advancing a rope looped around said sheave by application to said sheave of rotational forces comprising:

a central hub and opposed, facing first and second surfaces radially outwardly extending from said hub to an outer perimeter, each of said opposed surfaces being provided with alternating primary ridges and valleys extending from said hub to said outer perimeter, the primary ridges of said first one of said surfaces being aligned with a valley of the opposed second surface, said valleys being tapered in width toward said hub of said sheave and having a generally flat floor surface, the center of each said valley having a secondary ridge projecting from said floor surface, said secondary ridges each being of a height extending above its associated valley floor surface that is substantially less than the height of said primary ridges, each of said secondary ridges being in at least approximate alignment with a primary ridge of said facing sheave surface;

means for rotatably mounting said sheave; and a hand crank interconnected with the hub of said sheave for application of rotational forces thereto.

3. A winch according to claim 2, wherein said hand crank is interconnected to said sheave by a ratchet mechanism which enables application of rotational forces by said hand crank to said sheave in one rotational direction while enabling movement of said hand crank in the opposite rotational direction independently of said sheave.

4. A winch according to claim 2 further including a guiding cam surface positioned adjacent to the perimeter of said sheave for directing the movement of a rope looped around said sheave toward the hub of said sheave.

5. A winch according to claim 4 wherein said guiding cam surface comprises a moveable wheel which is biased toward said hub.

6. A winch according to claim 4 wherein said guiding cam surface comprises a movable arcuate cam surface movable from a position spaced from said sheave a distance sufficient to permit placement of a rope thereover, and toward said hub to retain a rope in engagement with said sheave.

7. A winch comprising a rotatable sheave mounted for rotation, and means for application of rotational forces thereto, said sheave having a base and two opposed faces with a plurality of generally radially extending alternating primary ridges and valleys circumscribing each of said two opposed faces of said sheave, each of said primary ridges extending outwardly from the base of said sheave in a curvilinear direction curving toward a rotational direction in which said rope is advanced, said primary ridges being positioned at regular intervals around the circumference of said sheave, said primary ridges projecting a first height above the surface of said valleys, a generally radially extending secondary ridge projecting from the center of the surface of each of said valleys, each of said secondary ridges having a second height, said second height being a minor fraction of said first height, a guiding cam surface adjacent to the outer perimeter of said sheave which maintains the rope in contact with said sheave, a housing within which said sheave is rotatably mounted, said housing being open for insertion and removal of a rope or cord around said sheave, and, a releasable ratchet mechanism which, when engaged, permits rotation of said sheave only in said rotational direction, and which, when released, permits free rotation of said sheave.

8. A winch according to claim 7 wherein said ridges have rounded edges whereby a rope or cord reeved thereon does not become frayed.

9. A winch according to claim 7 wherein a stripper element is positioned in contact with the base of said sheave to provide a means for removing the rope therefrom.

10. A winch according to claim 7 wherein said cam surface comprises an idler wheel.

11. A winch according to claim 7 wherein said cam surface comprises a movable arcuate cam surface movable from a position spaced from said sheave a distance sufficient to permit placement of a rope thereover, and toward said hub to retain a rope in engagement with said sheave.

12. In a tensioning mechanism for a rope or cord which includes a sheave rotatable under power, and means to apply rotational force to said sheave to cause rotation thereof, said rotatable sheave having two opposed faces with a plurality of generally radially extending ridges on said opposed faces and a releasable ratchet mechanism which, when engaged, permits rotation of said sheave in one direction but not the other, and which, when released, permits free rotation of said sheave, the improvement which comprises

- a plurality of alternating generally radially extending primary ridges and valleys circumscribing each of said two opposing faces of said sheave, said ridges being positioned at regular intervals around the circumference of said sheave and being located so that a primary ridge on one face of said sheave faces a valley on the opposite face of said sheave, each of said primary ridges projecting a first height above the surface of its adjoining valleys,
- a generally radially extending secondary ridge projecting from the center of the surface of each of said valleys, each of said secondary ridges having a second height, said second height being a minor fraction of said first height, and,
- a guiding cam surface adjacent to the outer perimeter of said sheave which maintains the rope in contact with said sheave.

13. A tensioning mechanism according to claim 12 wherein said housing is provided with means for mounting thereof onto a supporting surface.

14. A tensioning mechanism according to claim 12 wherein said means for rotation comprises a hand crank attached to at least one side of said sheave.

15. A tensioning mechanism according to claim 12 wherein said cam surface comprises a follower wheel which is biased against the rope near the point at which it exits the sheave.

16. A tensioning mechanism according to claim 12 wherein said cam surface comprises a movable arcuate cam surface movable from a position spaced from said sheave a distance sufficient to permit placement of a rope thereover, and toward said hub to retain a rope in engagement with said sheave, and further comprises means to temporarily fix said surface in each of said positions.

17. A winch comprising a rotatable sheave mounted for rotation, means for application of rotational forces to said sheave, a handle operatively connected to said sheave for causing rotation thereof, said sheave having a base and two opposed faces with a plurality of generally radially extending alternating ridges and valleys circumscribing each of said two opposed faces of said sheave, said ridges being positioned at regular intervals around the circumference of said sheave, said ridges projecting a first height above the surface of said valleys, a movable guiding cam surface movable between a use position adjacent to the outer perimeter of said sheave which maintains the rope in contact with said sheave and a release position spaced from said sheave wherein a rope can be placed on or removed from said sheave, a releasable lock for selectively maintaining the guiding cam surface at the use position and the release position, a housing within which said sheave is rotatably mounted, and, a releasable ratchet mechanism which, when engaged, permits rotation of said sheave only in said rotational direction, and which, when released, permits free rotation of said sheave.

18. A winch according to claim 17 wherein said cam surface comprises a follower wheel which is biased against the rope near the point at which it exists the sheave.

19. A winch according to claim 17 wherein said cam surface comprises a movable arcuate cam surface movable from a position spaced from said sheave a distance sufficient to permit placement of a rope thereover, and toward said hub to retain a rope in engagement with said sheave, and further comprises means to temporarily fix said surface in each of said positions.

* * * * *